United States Patent
Aigner et al.

(10) Patent No.: US 12,525,781 B2
(45) Date of Patent: Jan. 13, 2026

(54) METHOD AND DEVICE FOR MONITORING A THREE-PHASE NETWORK OPERATED IN A COMPENSATED MANNER FOR A TUNING CHANGE OF THE ARC SUPPRESSION COIL

(71) Applicant: HSP HOCHSPANNUNGSGERÄTE GMBH, Troisdorf (DE)

(72) Inventors: Markus Aigner, Stadl-Paura (AT); Thomas Schinerl, Hörsching (AT); Hannes Schuster, Marchtrenk (AT)

(73) Assignee: HSP Hochspannungsgeräte GmbH, Troisdorf (DE)

( * ) Notice: Subject to any disclaimer, the term of this patent is extended or adjusted under 35 U.S.C. 154(b) by 494 days.

(21) Appl. No.: 18/009,792

(22) PCT Filed: Jun. 8, 2021

(86) PCT No.: PCT/EP2021/065287
§ 371 (c)(1),
(2) Date: Dec. 12, 2022

(87) PCT Pub. No.: WO2021/249999
PCT Pub. Date: Dec. 16, 2021

(65) Prior Publication Data
US 2023/0223744 A1 Jul. 13, 2023

(30) Foreign Application Priority Data
Jun. 10, 2020 (EP) .................... 20179320

(51) Int. Cl.
*H02H 1/00* (2006.01)
*G01R 19/25* (2006.01)
*H02H 9/08* (2006.01)

(52) U.S. Cl.
CPC ....... *H02H 1/0007* (2013.01); *G01R 19/2513* (2013.01); *H02H 9/08* (2013.01)

(58) Field of Classification Search
CPC .... H02H 1/0007; H02H 9/08; G01R 19/2513; Y02E 40/30; H02J 3/18
See application file for complete search history.

(56) References Cited

U.S. PATENT DOCUMENTS 6,046,220 A 4/2000 Bernardon
2017/0328944 A1* 11/2017 Broeckmann .......... G01R 31/52

FOREIGN PATENT DOCUMENTS

CN 106786475 A * 5/2017 ........... G01R 31/003
CN 108964001 A * 12/2018 ............... H02H 9/08
(Continued)

*Primary Examiner* — Catherine T. Rastovski
*Assistant Examiner* — Yossef Korang-Beheshti
(74) *Attorney, Agent, or Firm* — Laurence A. Greenberg; Werner H. Stemer; Ralph E. Locher

(57) ABSTRACT

A method for monitoring a three-phase network that is operated in a compensated manner for a tuning change of the arc suppression coil. Reference network parameters and a reference network frequency are determined for a tuned state, and a current network frequency is determined for a current state. A reference characteristic variable, which is proportional to a displacement voltage, is determined for the current network frequency using the reference network parameters, and a current characteristic variable, which is proportional to a displacement voltage, is determined at the current network frequency. A differential variable is determined from the reference characteristic variable and the current characteristic variable, from which, with a predetermined threshold value being exceeded, a tuning change is identified and changed network parameters are determined.

6 Claims, 4 Drawing Sheets

(56) References Cited

FOREIGN PATENT DOCUMENTS

| | | | | |
|---|---|---|---|---|
| CN | 109995044 A | * | 7/2019 | |
| DE | 2017867 A1 | | 11/1970 | |
| DE | 3643391 A1 | | 8/1987 | |
| DE | 102008016136 A1 | | 10/2008 | |
| EP | 0832057 B1 | | 1/2001 | |
| EP | 2808688 A1 | * | 12/2014 | ............ G01R 27/16 |
| WO | WO 9634293 A2 | | 10/1996 | |
| WO | WO 9910959 A2 | | 3/1999 | |

* cited by examiner

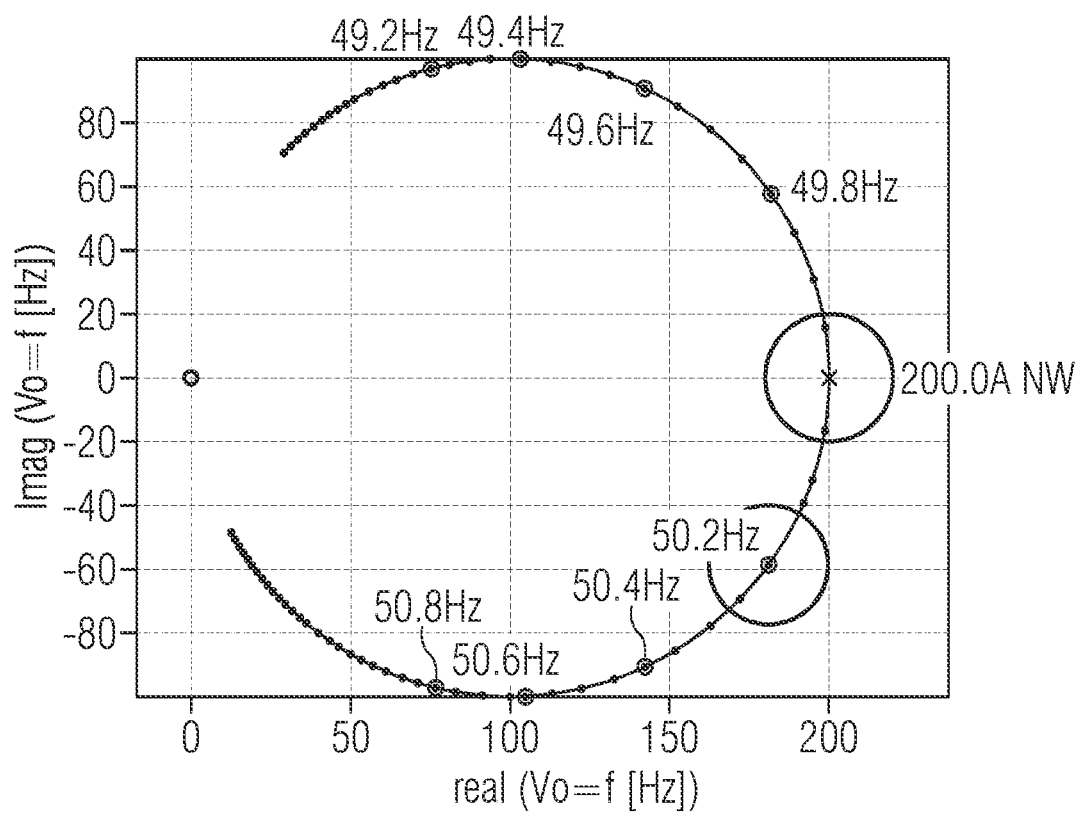

METHOD AND DEVICE FOR MONITORING A THREE-PHASE NETWORK OPERATED IN A COMPENSATED MANNER FOR A TUNING CHANGE OF THE ARC SUPPRESSION COIL

FIELD AND BACKGROUND OF THE INVENTION

The invention relates to a method and a device for monitoring a three-phase network operated in a compensated manner for a tuning change of the arc suppression coil.

In compensated networks, an arc suppression coil (Petersen coil) is used to compensate capacitive ground fault currents from output circuits with an inductive current.

If the inductive current through the arc suppression coil corresponds exactly to the capacitive zero currents of the output circuits (resonance tuning), the residual network-frequency fault current is a minimum and is determined by the active losses in the network.

In practice, a slight under- or over-compensation is often set, but it must be ensured that the step voltage that occurs does not exceed the permissible limits and the permissible duration for the given earthing conditions and the residual fault current at the fault location.

It is therefore very important to detect changes in the network configuration or changes in the detuning automatically and reliably in order that a new determination of the grid parameters is initiated and a new tuning point for the arc suppression coil can thus be determined and the arc suppression coil can be tuned accordingly in a tuning procedure.

Known methods exploit the fact that in real three-phase networks there is always a certain asymmetry in the individual phases, so that a certain displacement voltage occurs at the neutral point, i.e. also at the arc suppression coil. However, even in very symmetrical networks a sufficiently high displacement voltage can be achieved at the tuning point of the arc suppression coil by adding an artificial asymmetry in at least one phase or by feeding a network-frequency current into the neutral point of the transformer, and a change in the network detuning can then be detected by means of a significant change in the neutral-point displacement voltage.

Further tuning processes require a re-determination of network parameters, which is usually time-consuming and should be performed as infrequently as possible.

Network parameters for a three-phase network can be identified by determining the network parameters using network-frequency current infeed, or by means of multi-frequency methods or non-network-frequency current infeed, or by adjusting the coil position (as in plunger coils) or by changing the degree of detuning (in stepped coils).

It is known that rapid changes in the displacement voltages can also occur without changes to the network configuration, for example due to strong load current fluctuations, capacitively coupled signals, or also due to short-term fluctuations in the network frequency.

In particular, when determining the network parameters by adjusting the coil position or changing the degree of detuning (stepped coils), it is advisable to avoid too frequent tuning procedures, as this can have a negative effect on the service life of the arc suppression coil.

Previously known methods save the displacement voltage as a reference variable immediately after tuning of the arc suppression coil. The displacement voltage is then monitored for changes; additional filters may also be used.

If the triggering circle (vectorial measurement of the displacement voltage) is exited due to a change in the displacement voltage, a triggering delay is started. In FIG. 2, a trigger circle N2 for a "vectorial triggering" can be seen. If the displacement voltage is again within the trigger circle, the triggering delay is reset. After the triggering delay has expired, a new tuning procedure can be performed.

Triggering of tuning procedures too frequently by changes in the displacement voltage due to network frequency fluctuations can only be avoided in currently known systems by correspondingly long triggering delays or large permissible changes in the displacement voltage, which in some cases leads to an increase in the period of time in which the degree of compensation of the arc suppression coil does not correspond to the desired setting, or smaller changes in the degree of detuning of the network can no longer be reliably detected.

When using the arc suppression coil in combination with the active residual current compensation, in the event of a ground fault a compensation current is fed in which counteracts the fault current.

An active fault current can be caused by network losses and a reactive fault current, the reactive fault current being caused by a detuning of the network at the current network frequency.

In order to ensure complete compensation of the fault current in the event of a ground fault, a rapid response must be made to changes in the detuning of the network and to changes in the damping or changes in the asymmetry. The network parameters must be re-determined and the arc suppression coil must be re-tuned, at least in the event of major detuning changes in relation to the nominal frequency, since the converters used for residual current compensation have only limited power and cannot compensate for arbitrarily large reactive currents. The majority of the compensation of the reactive current component in the fault current is also carried out during the residual current compensation by the arc suppression coil. On the other hand, frequent triggering of tuning procedures is undesirable, as the sensitivity must be reduced during the calculation of the grid parameters and the response of the residual current compensation can be delayed.

SUMMARY OF THE INVENTION

It is therefore an object of the invention to detect changes in the network configuration and thus changes in the network detuning in a robust and safe manner, including in the event of network frequency changes, by means of a short triggering delay and small triggering thresholds.

The object is achieved by means of a method and a device of the aforementioned type, by determining reference network parameters and a reference network frequency for a tuned state and determining a current network frequency for a current state, and determining a reference characteristic variable which is proportional to a displacement voltage using the reference network parameters for the current network frequency, and determining a current characteristic variable, which is proportional to a displacement voltage, at the current network frequency, and determining a differential variable from the reference characteristic variable and the current characteristic variable, from which, when a predetermined threshold value is exceeded, a tuning change is identified and modified network parameters are determined.

The use of the invention ensures that a triggering criterion with a short triggering delay can be applied to carry out a fresh compensation, the criterion being very robust against triggering false alarms due to frequency fluctuations. In a refinement of the invention, it is provided that the reference characteristic variable and the current characteristic variable are each displacement voltages.

This makes it particularly simple to implement the method according to the invention.

In a refinement of the invention, it is provided that the magnitude of a vectorial difference is used for the differential variable.

This makes it particularly simple to implement the method according to the invention.

In a refinement of the invention, it is provided that the determination of the modified network parameters is time-delayed if the differential variable continuously exceeds the predetermined limit over a predetermined period of time.

This means that the method according to the invention can be carried out in a particularly robust manner and independently of faults.

In a refinement of the invention, it is provided that the network parameters comprise at least one inductance of the arc suppression coil and at least one line capacitance.

This makes it particularly simple to implement the method according to the invention.

The device according to the invention for monitoring a three-phase power network operated in a compensated manner for a tuning change of the arc suppression coil comprises a measuring device for detecting a displacement voltage and a network frequency, and a computing device for determining network parameters, wherein the device is configured to carry out the method according to the invention.

The invention is explained hereafter in more detail by means of an exemplary embodiment shown in the enclosed drawings. In the drawings:

BRIEF DESCRIPTION OF THE FIGURES

FIGS. 5-7 show examples of locus curves of a three-phase network.

DETAILED DESCRIPTION OF THE INVENTION

Figure 1:
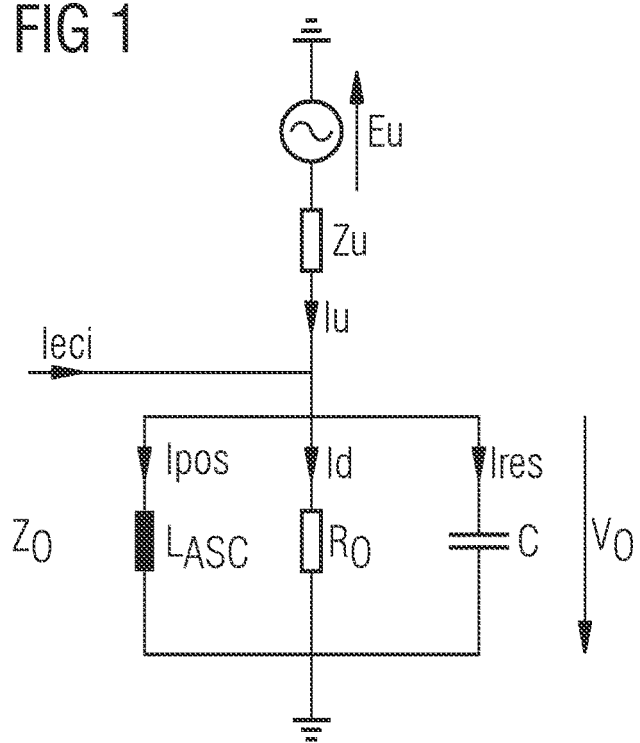
FIG. 1 shows a simplified null equivalent circuit diagram of a three-phase system.

FIG. 1 shows an example of a simplified null equivalent circuit diagram of a three-phase network.

A network asymmetry is illustrated, which is formed mainly by different conductor-earth capacitances in the three phases. In the null equivalent circuit, the unbalance current $I_u$ representing this unbalance is represented by the driving unbalance voltage $E_u$ and the unbalance impedance $Z_u$.

To compensate for the capacitive fault current $I_f$ due to the ground fault, the neutral point of the network is earthed by means of an arc suppression coil $L_{ASC}$ (Petersen coil).

The network impedance $Z_0$ shown in the equivalent circuit diagram is formed by the parallel connection of an ohmic equivalent resistance $R_0$ for the entire network losses, including the losses of the arc suppression coil, the network capacitance C (line capacitance), and the inductance $L_{ASC}$ of the arc suppression coil.

The equivalent resistance $R_0$ determines a damping current $I_D$. The impedance of the arc suppression coil $L_{ASC}$ and thus the level of an inductive compensation current can be modified directly by adjusting the air gap in the iron core of the arc suppression coil, or the secondary side of the arc suppression coil $L_{ASC}$ is wired to an inductance, a capacitor or a defined current infeed, and/or the neutral point or one of the three phases can be wired to an ohmic resistor, an inductor, a capacitor or a defined current infeed. Such measures and/or devices are known to the person skilled in the art, so they do not need to be explained or described in more detail.

The coil position can be determined by measuring the position using a potentiometer. This results in a coil current $I_{pos}$.

The tuning of the arc suppression coil $L_{ASC}$ takes place during the normal operation of the network (fault-free network condition), wherein the arc suppression coil $L_{ASC}$ is adjusted such that the inductive current through the arc suppression coil $L_{ASC}$ is the same as the capacitive current through the line capacitance (resonance current $I_{res}$).

In practice, for an arc-suppressed network, but one without active residual current compensation in normal operation, a slight over-compensation or under-compensation can be set. This can be achieved by setting a current $I_{pos}$ which depends on the position of the plunger of the arc suppression coil $L_{ASC}$.

With active residual current compensation, it may be appropriate to tune exactly to a resonance ($I_{pos}=I_{res}$).

With an exact tuning, the network impedance $Z_0=R_0$, which means that a maximum of the impedance of the parallel resonant circuit ($L_{ASC}$, $R_0$, C) is present, and the current through the fault location becomes minimal without residual current compensation.

Even with exact tuning, a complete compensation of the fault current is not possible with the arc suppression coil alone, since ohmic losses cannot be compensated by the arrangement.

These losses can occur by means of active residual current compensation, i.e. active current infeed with a compensation current $I_{ect}(t)$.

A complex displacement voltage $U_0$ occurs at the arc suppression impedance $Z_0$ and a displacement current $I_0$ flows through the network impedance $Z_0$.

The unbalance current $I_u$, the current through the network impedance $Z_0$ and the compensation or displacement current $I_{ect}$ converge at the neutral point of the three-phase network.

Figure 2:
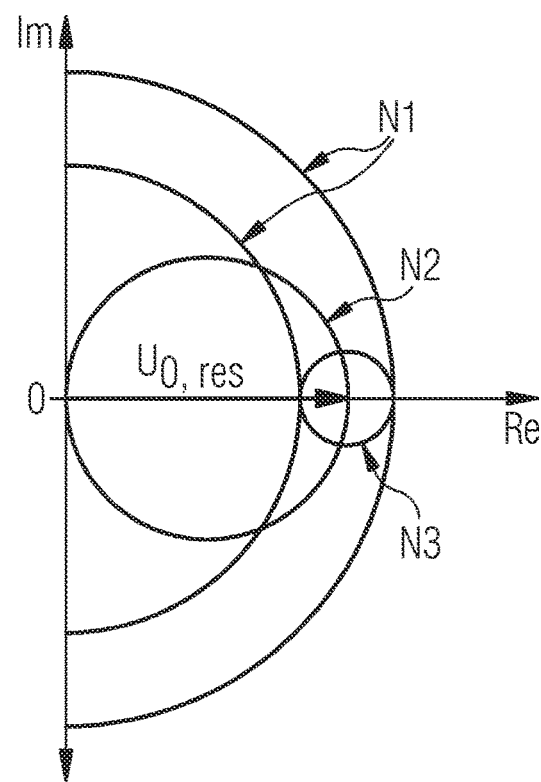
FIG. 2 shows examples of locus curves of displacement voltages and triggering thresholds when monitoring a neutral point voltage.

FIG. 2 shows examples of a locus curve N3 of the displacement voltage $U_0$ and triggering thresholds N1, N2 when monitoring a neutral point voltage.

Threshold N1 represents a triggering criterion based on a change in the absolute value of the displacement voltage $U_0$, and N2 indicates a triggering criterion based on the vectorial change in the displacement voltage $U_0$ for a re-compensation of the network according to the prior art.

Figure 3:
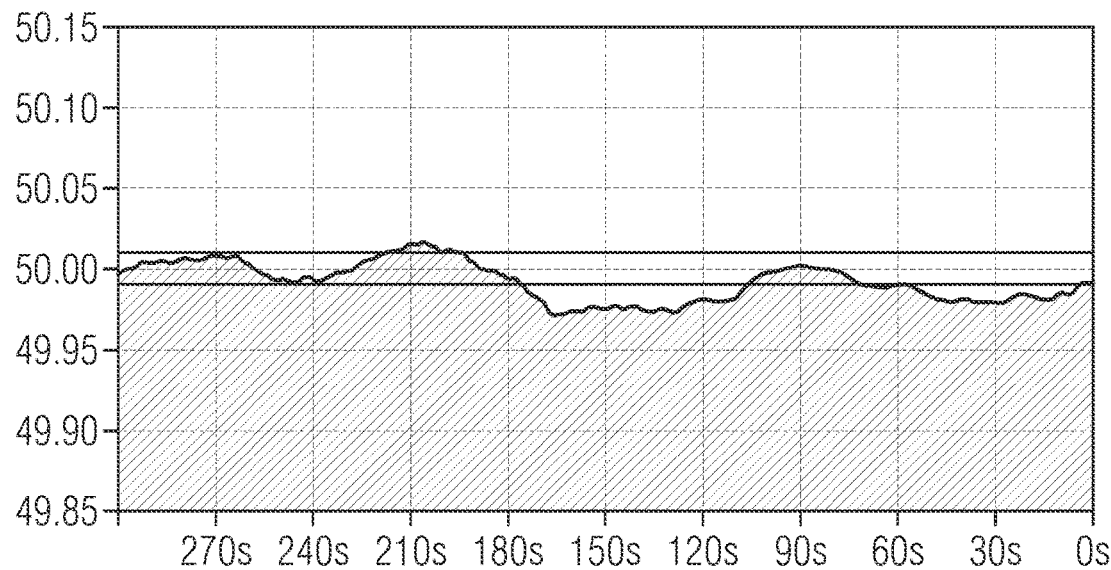
FIGS. 3-4 show examples of the frequency response of a three-phase network over time.

FIG. 3 shows a first example of the frequency response of a three-phase network over time.

It is a snapshot of the generally very stable European UCTE network, in which the frequency change is about 30 mHz within a period of five minutes.

Figure 4:
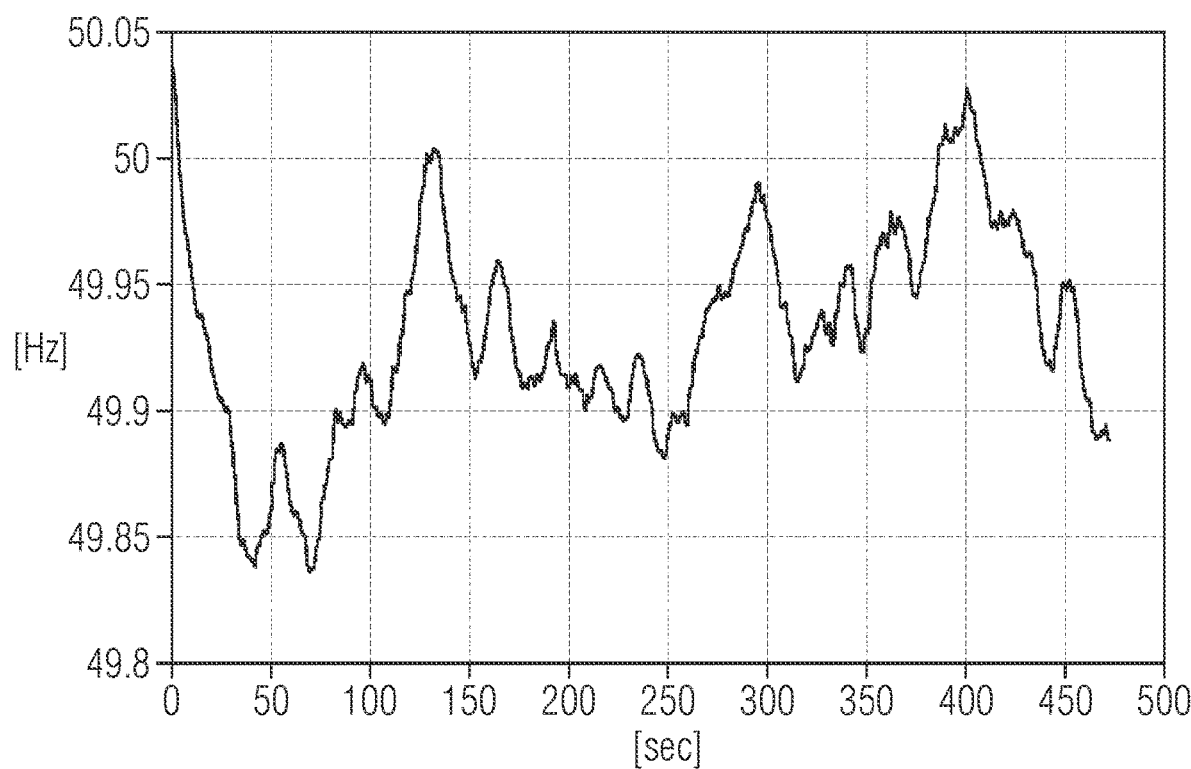

FIG. 4 shows a second example of the frequency response of a three-phase network over time.

The curve shown is a snapshot of an Australian network, in which the frequency change is approximately 200 mHz within a period of five minutes.

Compared to FIG. 3, it can be seen that the Australian network fluctuates significantly more in frequency.

Figure 5:
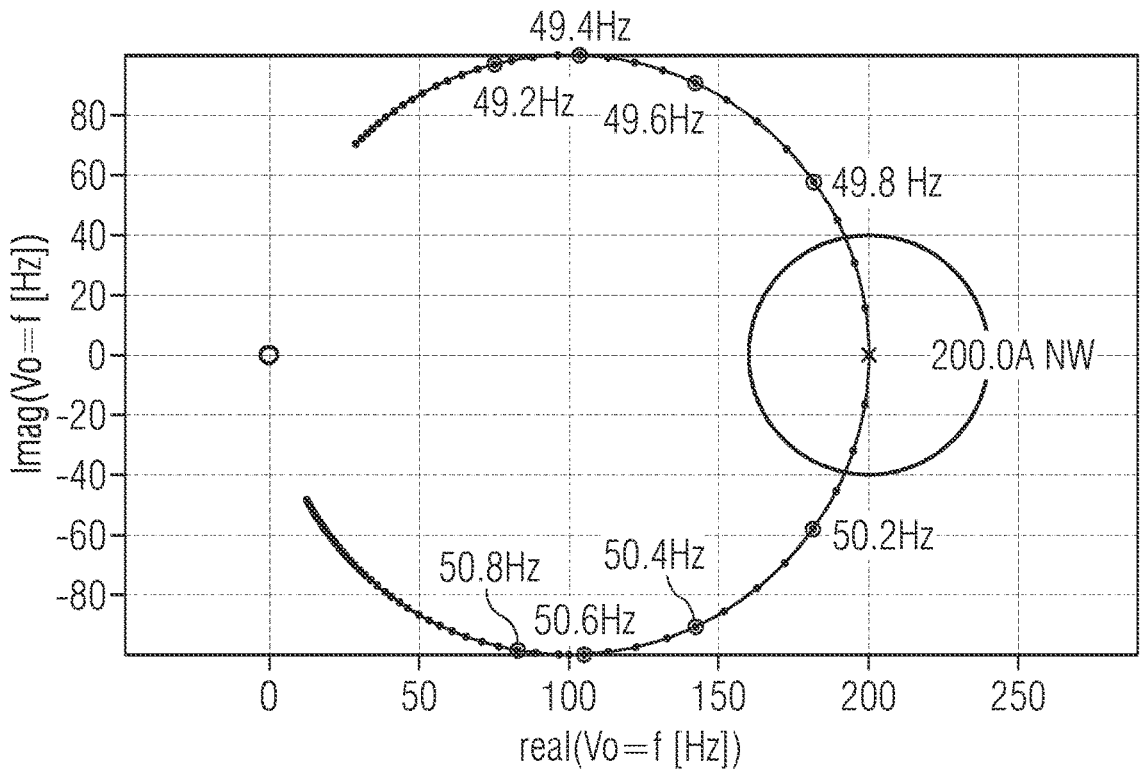

FIG. 5 shows a first example of a locus curve of a three-phase network in a 200.0 A-network with a circle drawn in for the trigger criterion.

At a damping current $I_D$ of 5 A, a frequency change of approximately 130 mHz can cause a vectorial voltage change of more than 20% and therefore, for example, the triggering criterion in the form of the corresponding circle radius in the figure will be met.

Calculation of the network admittance $Y_0$ as a function of frequency:

$$Y_o = \frac{1}{Z_o}$$

$$R_o = \frac{V_{nom}}{I_d}$$

$$Y_{o(f)} = \underbrace{\frac{1}{R_o}}_{Losses} + j \cdot \underbrace{\left( w_{(f)} \cdot C - \frac{1}{w_{(f)} L_{ASC}} \right)}_{Detuning}$$

$$U_{nom} \cdot Y_{o(f)} = U_{nom} \cdot \frac{1}{R_o} + j \cdot \left( U_{nom} \cdot w_{(f)} \cdot C - \frac{U_{nom}}{w_{(f)} L_{ASC}} \right)$$

$$U_{nom} \cdot Y_{o(f)} = I_d + j \cdot \left( U_{nom} \cdot \frac{w_{(f)}}{w_{(f50)}} \cdot w_{(f50)} \cdot C - \frac{U_{nom}}{\frac{w_{(f)}}{w_{(f50)}} \cdot w_{(f50)} \cdot L_{ASC}} \right)$$

$$k_f = \frac{w_{(f)}}{w_{(f50)}}$$

$$Y_{o(f)} = \frac{1}{U_{nom}} \cdot \left( I_d + j \cdot \underbrace{\left( k_f \cdot I_{res(f50)} - \frac{1}{k_f} \cdot I_{pos(f50)} \right)}_{I_{v(f)}} \right)$$

where a nominal voltage $U_{nom}$ is the phase voltage.

An angular frequency $\omega_{(f)}$ refers to the current network frequency, which can exhibit a deviation from the nominal network frequency of 50 Hz, while an angular frequency $\omega_{(f50)}$ refers to the nominal network frequency of 50 Hz.

$$W_{(f)} = 2 \cdot \pi \cdot f$$

A weighting factor $k_f$ expresses the current frequency f as a proportion of the nominal frequency f50.

The relevant frequency change corresponds to the difference between the current frequency and the frequency during the tuning procedure.

In the above relationships, the network frequency during a tuning procedure was assumed to be 50 Hz, which is expressed by the index "f50".

The considerations are also valid for networks with a different nominal frequency, such as 60 Hz.

After calculating the network parameters for each tuning procedure, including the unbalance impedance $Z_u$, the parameters of the parallel resonant circuit $Z_0$, formed from the inductance of the ground-fault arc suppression coil $L_{ASC}$, the line capacitances C and the total network losses $R_0$, are known more or less exactly.

Additional external inductors, such as fixed coils or distributed arc suppression coils, can be detected by the well-known multi-frequency method.

It is also possible to take a parametric approach to additional inductances, such as a fixed coil with a value at a nominal frequency and a switching state.

When calculating the network parameters via a coil adjustment or 50 Hz current infeed, only the detuning current $I_v$ can be determined; the back calculation to the network variable at the nominal or resonance frequency $I_{res}$ is performed via the measured coil position with $I_{res} = I_{pos} - I_v$.

The network frequency is measured repeatedly, for example by measuring the reference voltage between two phases. The network parameters are expressed in terms of the measured frequency.

After the tuning procedure, the displacement voltage $U_{0,ref}$ is saved and used as a reference variable for the vectorial difference formation at the current frequency.

This measured value can be acquired with or without additional filters, or else parametrically based on the determined network parameters.

The reference displacement voltage $U_{0,ref}$ can now also be related to the currently measured network frequency via the network parameters in order to achieve frequency-dependent triggering and compensation.

Based on the relationships described above, the method according to the invention for monitoring a three-phase network operated in a compensated manner for a change in the tuning of the arc suppression coil can be summarized by the following method steps:

reference network parameters and a reference network frequency are determined for a tuned state, a current network frequency is determined for a current state, a reference displacement voltage is determined from the reference network parameters for the current network frequency, a current displacement voltage is determined at the current network frequency, a differential variable is determined from the reference displacement voltage and the current displacement voltage using the magnitude of a vectorial difference, from which, when a predetermined threshold value is exceeded, a tuning change is identified and modified network parameters are determined.

The above steps can be executed repeatedly, wherein the determination of the modified network parameters is time-delayed if the differential variable continuously exceeds the predetermined limit over a predetermined period of time.

The calculation of the reference characteristic at the current frequency f can be carried out, for example, from the network parameters of the simplified null equivalent circuit according to FIG. 1.

The network impedance $Z_{o(f)}$ and the unbalance impedance $Z_{u(f)}$ can be frequency-dependent.

$$Z_{o(f)} = \frac{1}{Y_{o(f)}}$$

$$U_{o(f)REFERENCE} = \left( \frac{E_u}{Z_{o(f)} + Z_{u(f)}} + I_{eci} \cdot \frac{Z_{u(f)}}{Z_{o(f)} + Z_{u(f)}} \right) \cdot Z_{o(f)}$$

The reference characteristic variable identified can therefore be used to form a difference value with respect to the measured displacement voltage.

Optionally, the differential variable can additionally be filtered, for example by means of averaging, or linear or even non-linear filtering.

Figure 6:
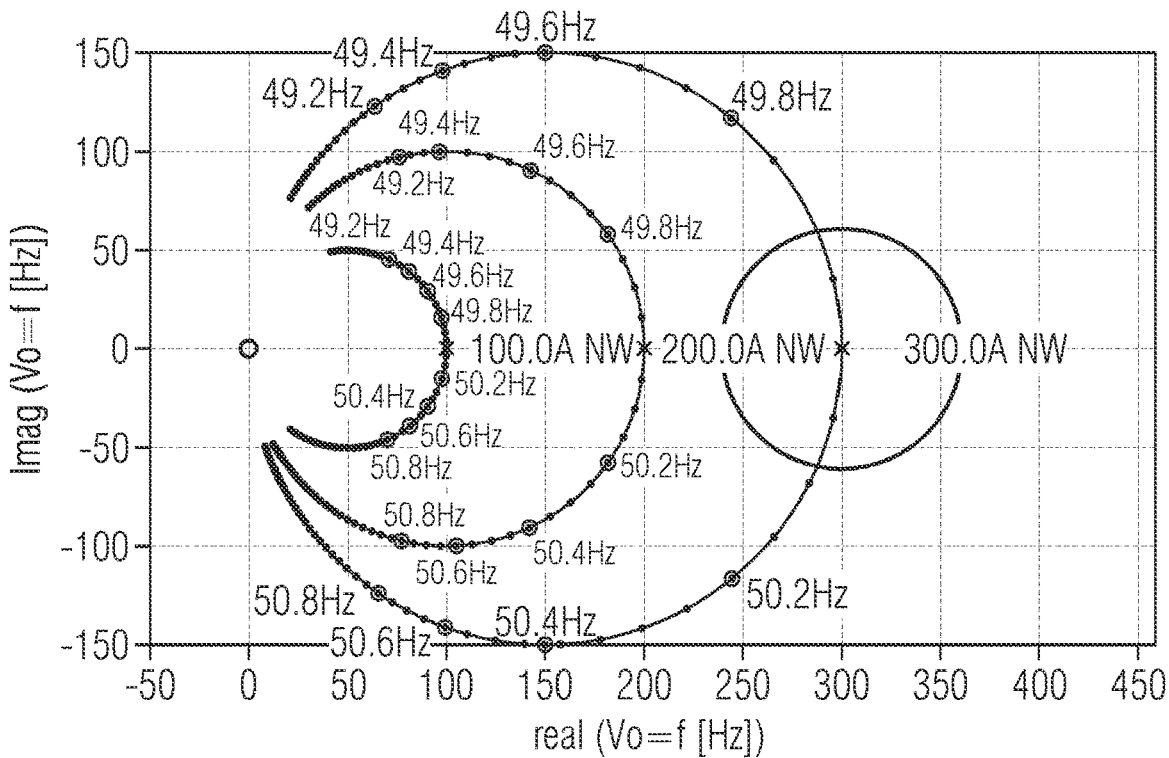

FIG. 6 shows a second example of locus curves of a three-phase network in a 100.0 A-, 200.0 A- and a 300.0 A-network, with a circle drawn in for the trigger criterion for the latter network.

At a damping current $I_D$ of 5 A, a frequency change of approx. 90 mHz can cause a vectorial voltage to change by more than 20% and therefore, for example, the triggering criterion in the form of the corresponding circle radius in the FIG. will be met.

FIG. 7 shows a third example of a locus curve of a three-phase network in a 200.0 A-network.

Two circles are shown, one with its center at 50.0 Hz and one with its center at 50.2 Hz, which allow a frequency-dependent adjustment of the trigger circle.

In other words, the trigger criterion for a fresh determination of the network parameters is defined frequency-dependently.

As long as the triggering criterion is not exceeded by the current displacement voltage, the inductance of the arc suppression coil $L_{ASC}$ is kept constant.

LIST OF REFERENCE SIGNS

C network capacitance
$E_u$ driving unbalance voltage
$I_d$ damping current
$I_{eci}$ compensation current (enhanced current injection, ECI)
$I_{pos}$ current with respect to coil core position
$I_{res}$ resonance current
$I_u$ unbalance current
$I_v$ detuning current (Iv=Ipos−Ires)
$L_{ASC}$ inductance of the arc suppression coil (ASC)
N1, N2 threshold value
N3 locus curve of the displacement voltage $U_0$
NW network
$R_0$ equivalent resistance
$U_0$, $U_{0,res}$ displacement voltage, zero voltage
$Z_0$ impedance of arc suppression coil
$Z_u$ impedance unbalance

The invention claimed is:

1. A method for monitoring a three-phase power network operated in a compensated manner for a tuning change of an arc suppression coil, the method which comprises:
    ascertaining reference network parameters and a reference network frequency for a tuned state;
    ascertaining a current network frequency for a current state;
    determining a reference characteristic variable, which is proportional to a displacement voltage, using the reference network parameters for the current network frequency;
    determining a current characteristic variable, which is proportional to a displacement voltage, at the current network frequency;
    determining a differential variable from the reference characteristic variable and the current characteristic variable, and identifying a tuning change from the differential variable when a predetermined threshold value is exceeded, and ascertaining modified network parameters; and
    performing a tuning procedure to tune the arc suppression coil based on the modified network parameters ascertained.

2. The method according to claim 1, wherein each of the reference characteristic variable and the current characteristic variable is a displacement voltage.

3. The method according to claim 1, which comprises using a magnitude of a vectorial difference as the differential variable.

4. The method according to claim 1, which comprises time-delaying a determination of the modified network parameters if the differential variable continuously exceeds the predetermined threshold value over a predetermined period of time.

5. The method according to claim 1, wherein the reference network parameters and/or the modified network parameters comprise at least one inductance of the arc suppression coil and at least one line capacitance.

6. A device for monitoring a three-phase network for a tuning change of an arc suppression coil, the device comprising:
    a measuring device for ascertaining a displacement voltage and a network frequency;
    a computing device connected to said measuring device for determining reference network parameters and modified network parameters; and
    wherein the device is configured to carry out the method according to claim 1.

* * * * *